United States Patent [19]

Griswold, II

[11] Patent Number: 4,477,042
[45] Date of Patent: Oct. 16, 1984

[54] VORTEX ALLEVIATING WING TIP

[76] Inventor: Roger W. Griswold, II, Ben Franklin Rd., Old Lyme, Conn. 06371

[21] Appl. No.: 458,736

[22] Filed: Jan. 17, 1983

Related U.S. Application Data

[63] Continuation-in-part of Ser. No. 226,191, Jan. 19, 1981, abandoned.

[51] Int. Cl.³ .............................................. B64C 23/00
[52] U.S. Cl. ...................................... 244/199; 244/91
[58] Field of Search .............. 244/198, 199, 201, 207, 244/208, 91, 35 R, 210

[56] References Cited

U.S. PATENT DOCUMENTS

| | | | |
|---|---|---|---|
| 2,507,611 | 5/1950 | Pappas et al. | 244/198 |
| 2,552,073 | 5/1951 | Tindall | 244/91 X |
| 2,687,262 | 8/1954 | Custer | 244/35 R |
| 3,090,584 | 5/1963 | Kuchemann et al. | 244/199 |
| 3,411,738 | 11/1968 | Sargent | 244/91 |
| 3,596,854 | 8/1971 | Haney, Jr. | 244/199 |
| 3,669,386 | 6/1972 | Jacobs et al. | 244/207 |
| 4,205,810 | 6/1980 | Ishimitsu | 244/91 |

FOREIGN PATENT DOCUMENTS 1756541  4/1970  Fed. Rep. of Germany ...... 244/207

Primary Examiner—Sherman D. Basinger
Attorney, Agent, or Firm—McCormick, Paulding & Huber

[57] ABSTRACT

A wing tip is contoured and shaped to bring about a controlled mergence of fluid flows across the upper and lower wing surfaces and alleviation of the resulting vortex when the wing is producing lift or thrust. Control through geometry of the wing tip can be augmented by discharging fluid into the merging flows which weakens the strength of the vortex and results in more rapid dissipation in the wake of an aircraft. Additionally, the origin of the vortex is prevented from migrating inboard of the wing tip which improves overall wing efficiency.

24 Claims, 25 Drawing Figures

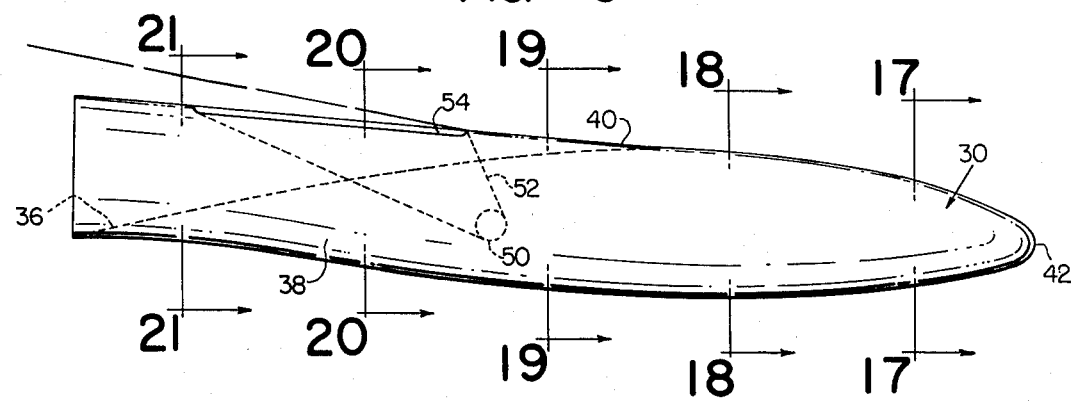
FIG. 6
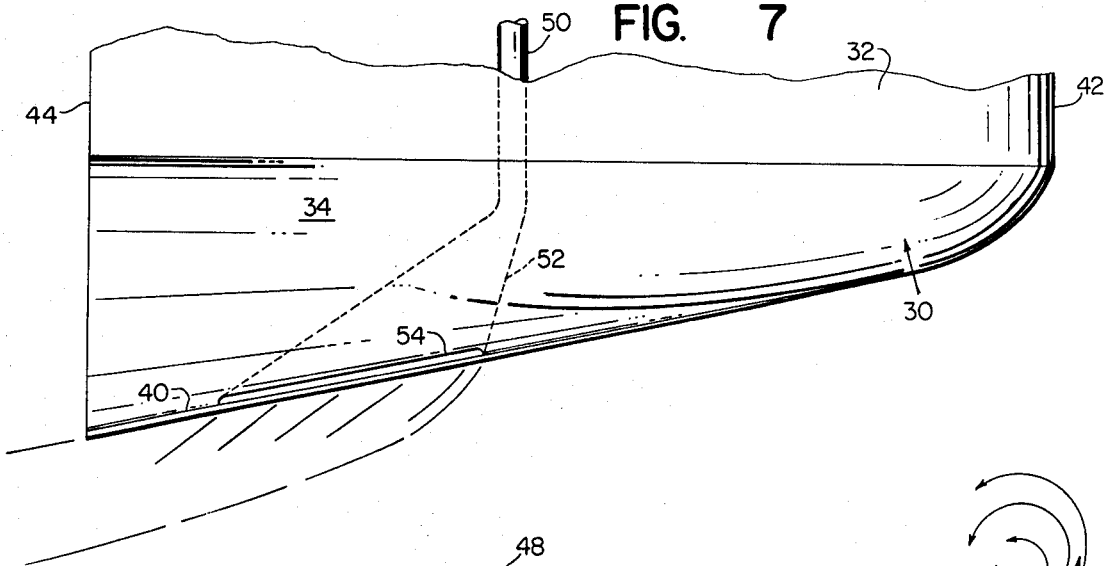
FIG. 7
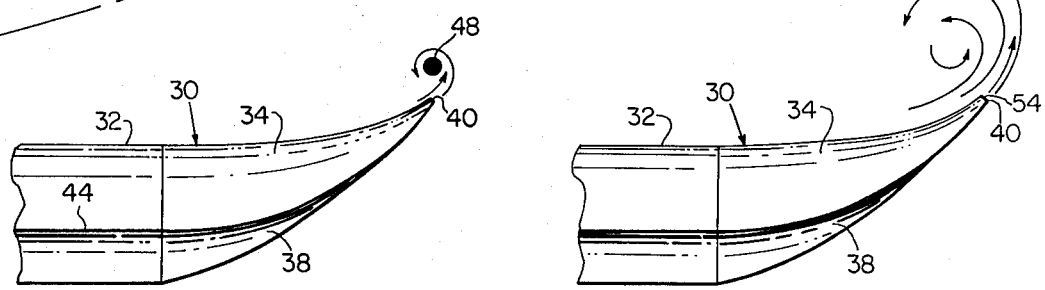
FIG. 5
FIG. 8

VORTEX ALLEVIATING WING TIP

CROSS REFERENCE TO RELATED APPLICATION

This application is a continuation-in-part of U.S. application Ser. No. 226,191 filed Jan. 19, 1981 and, now abandoned.

BACKGROUND OF THE INVENTION

The present invention relates to wings, rotor blades, propellers and the like which generate lift or thrust and have a free outboard end at which vortices develop due to the mergence of the fluid flows over the lift-producing surfaces at different pressure and velocity levels. More particularly, the present invention is concerned with wing tips which are designed to alleviate vortices and to improve the overall lift or thrust producing efficiency of the wings.

Vortex alleviation is a well-known problem that has particular importance in large, heavy aircraft with significant span loading. In view of the importance of span loading for such craft, tip vortices generated at slow speeds in takeoffs and landings constitute lethal phenomenon insofar as they affect other aircraft, particularly light aircraft traversing or following in the wake of the heavier aircraft. The hazardous wake region may extend several miles behind larger craft before the effects of vortices are dissipated. The existance of such vortices mandates exceptionally large separation distances between successive aircraft in approach and climb out patterns and, consequently, determines the maximum acceptance rate for aircraft at a particular airport. With the growth of air travel, major airports are forced to build additional runways to keep up with traffic at the maximum acceptance rates. For these reasons, it is desirable to alleviate vortex generation and thereby improve air traffic control and safety.

Additionally, the generation of vortices at wing tips is accompanied by a corresponding reduction in wing efficiency. The flows from above and below the wings normally merge and create the vortex on the upper wing surface inboard of the tip, and as a consequence, the portion of the wing outboard of the vortex origin is washed above and below by the same flow and does not contribute significantly to lift or thrust in the absence of a differential pressure. Also greater induced drag is generated.

The vortex problem is addressed in a number of prior U.S. Patents such as U.S. Pat. Nos. 3,411,738 and 4,108,403. In these patents the configuration of the wing tip is designed to produce certain effects that interfere with the vortex development in the wake of an aircraft. U.S. Pat. Nos. 3,692,259, 3,480,234, 3,841,587 and 4,040,578 all rely upon fluid means to counteract the effect of vortices inherently developed at wing tips. The present invention employs the broad principles of shape refinement and fluid control disclosed in the referenced patents.

It is accordingly a general object of the present invention to alleviate vortex problems in the wake of a lift or thrust producing wing, and at the same time improve wing efficiency.

SUMMARY OF THE INVENTION

The present invention relates primarily to wing tips that alleviate vortices generated in the wake of a wing as a natural consequence of the merging flows at the free, outboard end of the wing. In this respect, the term "wing" as used in a connection with the invention, refers not only to the primary lift generating airfoils of aircraft, but also to flaps including movable control surfaces, stabilizers, rotor blades, propellers, fans, compressor and turbine blades, hydrofoils and other types of dynamic lift or thrust generating appendages on which tip vortices develop due to the mergence of relatively high pressure flow over one surface and relatively low pressure flow over the opposite surface.

In one form, the invention is embodied in a wing tip having contoured surface portions joined with the oppositely disposed wing surfaces at the spanwise termination of the wing. The contoured surface portions forward of the chord point or axis of maximum thickness of the wing are convexedly rounded and smoothly interconnect the wing surfaces. Aft of the chord point, the contoured surfaces join in a sharply angled outboard edge extending rearward to the trailing edge of the wing. In one form, the surface portions joined at the sharply angled edge are convex and concave respectively, and define a flattened airfoil tip with either positive, negative or zero conical camber.

In planform, the sharply angled outboard edge of the wing tip is located effectively no closer to the main body of the craft at the trailing edge of the wing than at the chord point of maximum thickness. By maintaining a large spanwise dimension at the trailing edge of the wing tip, the flow coming from the underside of the wing to the upper side is impeded by the projecting edge, which reduces or eliminates the inboard migration of the vortex origin and the resulting reduction in effective aspect ratio, that is, the effective span squared divided by the wing area.

Means for discharging a fluid may be provided at the sharply angled outboard edge to inject fluid into the merging flows over opposite sides of the wing and thereby weaken the resulting vortices. Such discharged fluid can also shift the vortex origins outboard on the wing and by so doing, increases the effective span and aspect ratio of the wing. The result is a reduction in induced drag and an overall increase in the operational efficiency of the wing.

A further aspect of the present invention relates to means for selectively discharging fluid outboard or inboard over the wing to apply control moments to the craft to which the wings attach. Since the inboard or outboard flow of fluid has the effect of encouraging or discouraging vortex generation, the resulting reduction or improvement in lift generating efficiency is used to create the control moments. Such moments can be used for both maneuvering the craft and for stabilization.

Accordingly, the improved wing tip of the present invention has several advantageous features. The tip reduces the strength and persistence of vortices that are a threat to other craft. The induced drag of a wing incorporating the tips is reduced with an overall improvement of wing efficiency, and control moments can also be generated by varying the effect of the improved tip on wing efficiency. The net result is a more energy-efficient aircraft characterized by greater fuel economy.

BRIEF DESCRIPTION OF THE DRAWINGS

FIG. 5 is an elevation view of the wing tip in FIG. 4 as seen from the trailing edge.

FIG. 6 is an end view of a wing tip similar to that shown in FIG. 4 with additional means for discharging fluid from the outboard edge.

FIG. 7 is a top plan view of the wing tip in FIG. 6.

FIG. 8 is an elevation view of the wing tip in FIG. 6 as seen from the trailing edge.

DESCRIPTION OF THE PREFERRED EMBODIMENTS

Figure 1:
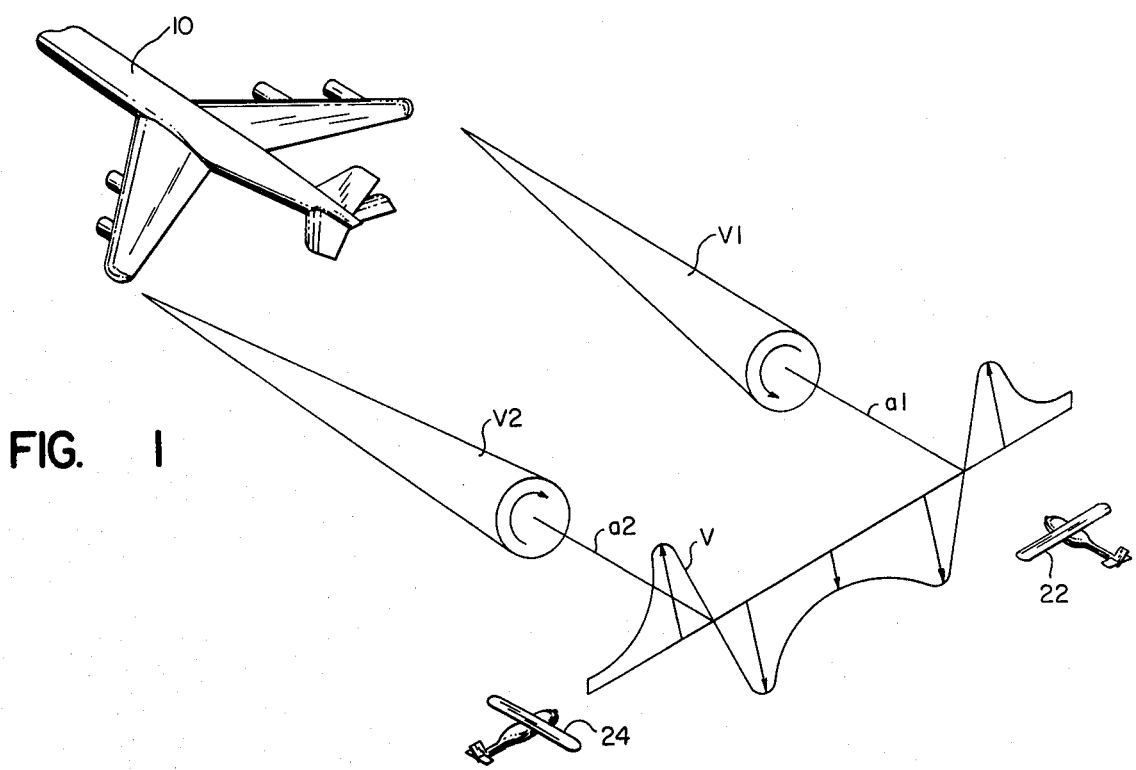
FIG. 1 illustrates schematically a typical vortex pattern and velocity distribution in the trailing wake of an aircraft.
Figure 2:
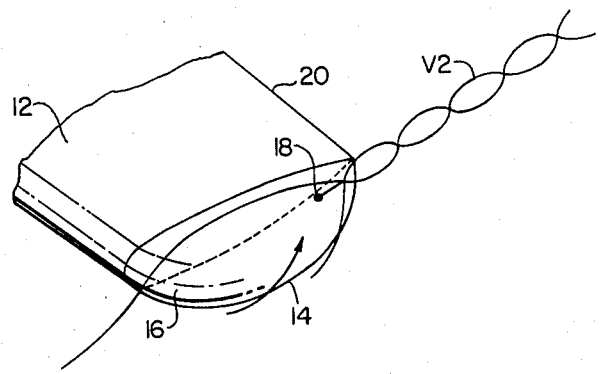
FIG. 2 illustrates in more detail the manner in which vortices are generated at the outboard edge of a conventional wing tip.

FIG. 1 illustrates typical vortices that are generated by the lift-producing wings of an aircraft 10. The vortices V1, V2 originate in the wing tip area at each side of the craft due to the confluence or merging of air flows from the upper and lower surfaces of the wing as illustrated more particularly in FIG. 2. In FIG. 2 the relatively high pressure air from the lower surface of the wing 12 flows upwardly around the outboard edge 14 of the wing tip 16 and mixes with the low pressure flow of air over the upper surface of the wing. The existence of a pressure differential between the two flows over the surfaces of the wing is inherent whenever the wing is loaded and generating lift or thrust. In the absence of a shroud or endplate, the mixing of the two flows at the wing trip area occurs naturally in a vortex pattern. The origin 18 of the vortex generally lies along a chord of the wing aft of the point or axis where the wing has its greatest thickness which usually lies in the midchord region. The origin represents the point at which the flows above and below the wing begin to intertwine and create the spiral turbulence that characterizes the vortex in typical three-dimensional lifting flow.

The vortices V1, V2, in FIG. 1 may extend for several miles in the wake of large jet aircraft and can create severe turbulence to the following aircraft 22 or aircraft 24 traversing the wake. The velocity distribution V of the turbulence in the wake illustrated in FIG. 1 shows that a rapid reversal occurs at the axes or cores a1, a2 of the vortices. Behind large, heavily loaded aircraft, the magnitude of the change is so severe that it can far exceed the control capability of following aircraft and the following craft may be turned upside down or pitched violently upwardly or downwardly if the structural integrity of the craft can withstand the loads. This is not always the case with light aircraft traversing the wake of heavy aircraft particularly in the slow speed range of the heavy craft.

In addition to turbulence in the wake of an aircraft, the vortex phenomenon also contributes to reduced wing efficiency by increasing induced drag or, drag attributable to lift. As shown in FIG. 2, the origin 18 of the vortex V2 is located inboard of the outboard edge 14 near the trailing edge 20. The high pressure flow from below the wing passes upwardly around the edge 14 and inboard where mixing with the low pressure flow over the wing occurs at the origin 18. Thus, the outer portion of the wing tip 16 does not significantly contribute to the overall lift generated due to the absence of an effective pressure differential outboard of the origin 18.

Figure 3:
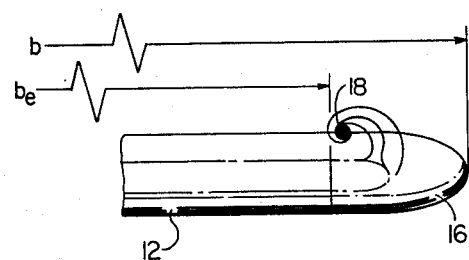
FIG. 3 illustrates the effective reduction in span of a wing due to the inboard migration of a vortex origin and the rounded planform configuration of the prior art wing tip shown in FIG. 2.
Figure 4:
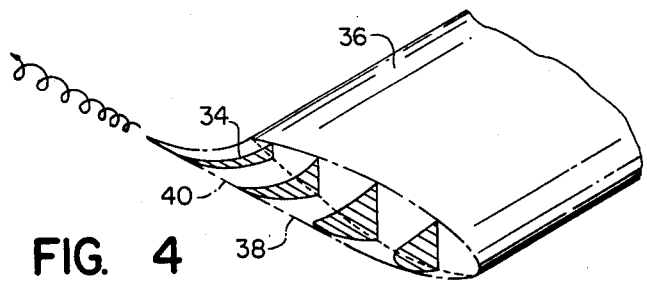
FIG. 4 is a perspective view showing the wing tip of the present invention in one embodiment having a negative conical camber.

FIG. 3 illustrates the problem in more detail. The wing 12 as viewed from the leading edge has a geometric span b defined by the outermost point of the wing tip 16. There is an inherent reduction or loss in the effective span and aspect ratio due to the fact that the vortex origin 18 develops somewhat inboard of the outboard edge. This loss is further agravated by the rounded planform of the tip 16 aft the midchord. The foreshortened effective span $b_e$ near the trailing edge (as indicated by the wing section in phantom) allows the origin to develop even further inboard. As a result, there is a significant loss in lift generated at the tip region, and the wing consequently has an effective span less than the geometric span. The aspect ratio of the wing is proportional to the square of the effective span, and thus suffers significantly from the loss in span. Since induced drag varies inversely with the aspect ratio, the loss in effective span appreciably increases the induced drag of a wing.

FIGS. 4–7 illustrates a wing tip 30 in accordance with the present invention which is intended to alleviate the adverse effects of vortices in the wake of an aircraft as well as improve the operation of the aircraft. The novel features of the wing tip which serve the vortex-alleviating function are as follows:

a. A sharply angled edge after the chord point of maximum thickness to precipitate vortex generation and immediate separation.

b. Substantially flat or parallel surfaces adjacent the outer edge of the tip to minimize the pressure differential between the flows above and below the wing at the confluence or mergence of the flows along the sharply angled edge.

c. Camber or curvature of the tip to control the direction of the air flow at the mergence.

d. Edge jet blowing into the merging flows.

e. No diminuition of span at trailing edges.

Figure 20:
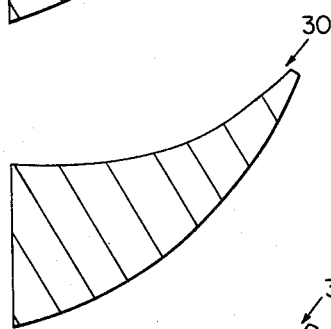
Figure 21:
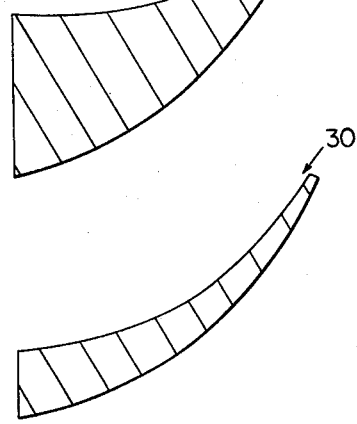
Figure 22:
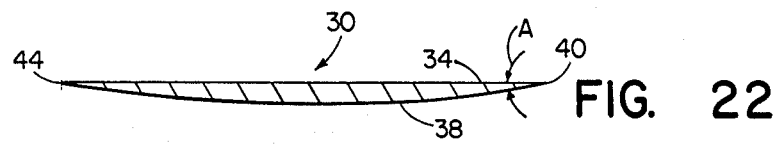
FIGS. 22 and 23 are chord-wise cross sectional views of the wing tip at the sectioning lines shown in FIG. 7.
Figure 23:
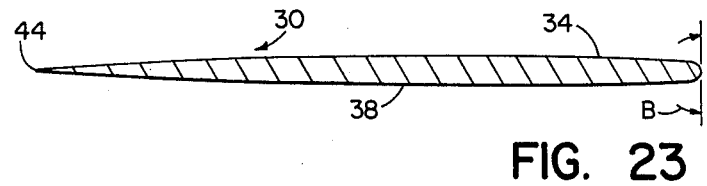

The tip 30 forms the outer end of a wing 32 or similar airfoil, and in the illustrated embodiment is an upswept tip having a negative conical camber. The tip 30 has an upper contoured surface 34 which bends gradually upward and connects smoothly with the upper wing surface 36 to form a continuous spanwise extension of the wing. The tip 30 also has a contoured lower surface 38 which is similarly bent and connects with the lower wing surface. The two surfaces 34, 38 are basically convex forward of the chord point of maximum thickness, and aft of that chord point, the upper surface 34 takes on a generally concave configuration while the lower surface 38 has a convex configuration. Several transverse sections through the tip are shaded in FIG. 4 and sections identified in FIGS. 6 and 7 are shown in detail in the sectional view of FIGS. 17-23 to illustrate the general contours at various stations between the leading and trailing edges. Sectional views 24 and 25 show sections similar to FIGS. 20 and 21 but illustrate an alternative embodiment of the tip. The surfaces 34, 38 are rounded and blend into the wing forward of the maximum thickness point to form a smooth, streamlined fairing extending rearwardly from the leading edge 42 of the wing as illustrated in the chordwise section of FIG. 23. The surfaces meet along the outboard edge at large obtuse angles B, generally 180 degrees. Aft of the maximum thickness point the surfaces 34 and 38 join and define a sharply angled edge 40 which constitutes a portion of the outboard edge of the wing between the chord point of maximum thickness and trailing edge 44. FIG. 22 indicates that the surfaces meet along the edge 40 at acute angles A, generally not greater than 10 degrees, and the angles decrease progressively toward the trailing edge 44. The surfaces project spanwise outwardly to the sharply angled edge 40 with a gradual taper as shown in FIGS. 20, 21, and with little or no curvature in the chordwise direction between the chordpoint of maximum thickness and the trailing edge 44 as shown in FIG. 22. Thus, the surfaces become substantially parallel near the edge of the tip 30 for reducing the differential pressure between the upper and lower surfaces and thereby alleviating the pressures which tend to create the vortices.

Figure 24:
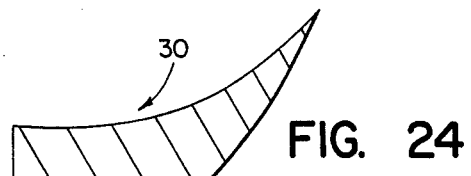
FIGS. 24 and 25 are spanwise cross sectional views similar to FIGS. 20 and 21, respectively, and show an alternate configuration of the wing tip.
Figure 25:
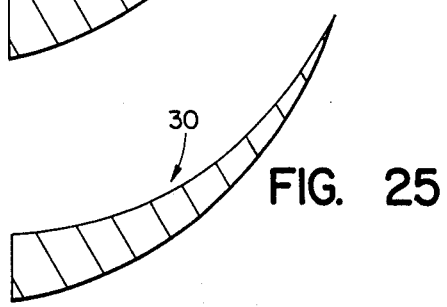

Reference to a sharply angled edge means that the upper and lower surfaces meet in a non-rounded configuration which prevents the air flow below the wing surface from easily following the surface contours upwardly toward mergeance over the upper surface. Specifically, a sharply angled edge includes a knife edge shown in FIGS. 24, 25 formed by surfaces which meet at acute angles as well as a squared-off edge shown in FIGS. 20, 21 which permits fluid to be discharged through an opening of finite cross section in the edge as explained further below.

Such sharply angled edges impede circulation around the tip from below the wing, and prevent a smooth confluence of the flows above the wing surface. Thus the vortices precipitate with immediate separation from the tip along the edge throughout the useful lifting angle of attack range of the wing with or without camber. There is no inboard migration of the vortices with the subsequent loss of lift as described above in connection with FIG. 3.

It will be observed in FIG. 6 that the sharply angled edge 40 along substantially its entire length lies above the plane of the upper wing surface 36; however, the edge can also originate in the midplane of the wing or lower and extend rearwardly to a level above, below or in line with the upper surface 36. Preferably at least one quarter of the edge 40 from the trailing edge forward is located above the upper wing surface 36.

The convex curvature of the lower surface 38 which leads to the upswept edge 40 allows the high pressure flow under the wing to move gradually upwardly and outwardly as it merges with the low pressure flow from the upper surface of the wing. Thus, the wing tip curvature also causes the two flows to merge at a vortex origin 48 in FIG. 5 which is situated adjacent the outboard edge of the wing at all useful angles of attack rather than at an inboard location as shown on the prior wing of FIGS. 2 and 3. The effective span of the wing in this situation approximates the geometric span, and as a consequence, the lift-generating efficiency of the wing is not adversely affected by the inherent vortex phenomenon.

In order to further improve the efficiency of the wing, the spanwise dimensions of the wing tip 30 aft of the chord point of maximum thickness, are not substantially smaller than the dimensions forward of the point, and preferably, as shown in FIG. 7, the sharply angled edge 40 sweeps outwardly and rearwardly at an angle so that the spanwise dimension at the trailing edge is greater than the spanwise dimension at the chord point of maximum thickness. The larger dimensions at the trailing edge render the inboard migration of the vortex origin more difficult and can even promote outboard shedding of the vortex to further improve the effective span and aspect ratio of the wing.

A further improvement in the vortex alleviation capacity of the wing tip 30 is achieved by providing discharging means along the sharply angled edge 40. For example, a duct 50 in FIGS. 6-7 may be provided within the wing 32. A diffuser section 52 of the duct has an exit aperture in the form of a slot 54 along a portion of the edge 40. The slot is preferably located along that portion of the edge 40 where the vortex origin is most likely to form. When the duct 50 is supplied with fluid, such as bleed air from the compressor section of a jet engine, a jet of air issues in a sheet from the slot 54 and combines with the flow of air across the upper and lower wing surfaces to disperse the tight laminar core that exists in the center of the vortex of FIG. 5. FIG. 8 illustrates the combined effect of the fluid discharging means in the edge 40 and the negative conical camber of the wing tip 30. Preferably the diffuser portion of the duct 50 directs the discharged fluid outwardly through the slot 54 generally tangentially of the tip surfaces 34, 38. In this manner, the flow of air over the surfaces joins with the discharged fluid at a comparable velocity and forms a vortex which is lacking the tight laminary core. Essentially, the effect of the discharged fluid alleviates the velocity differentials of the flows over the upper and lower surfaces of the wing and thereby decreases circulation within the vortex region. Theoretically the vortex could be substantially eliminated if the volume and the velocity of the discharged fluid outwardly and rearwardly was sufficient; however, the energy required for such a system and the added structure is not necessary since the diffusion of the confluent flows in the vicinity of the wing substantially mitigates the downstream effect, and the dangerous wake region behind a craft is greatly foreshortened and alleviated.

It will also be observed that since the diffuser 52 directs the discharged fluid outboard of the wing tip, there is less opportunity for the flow from under the wing tip to move around the sharply angled edge 40 and establish a vortex origin at an inboard location. There is, thus, no reduction in the effective span of the wing, and there is even an improvement provided that the discharging velocity and its angularity are sufficient to shed the vortex at a station outside of the outboard edge. Accordingly, the discharging means cooperates with the upswept contours of the wing tip to produce an overall improvement in wing efficiency.

Figure 9:
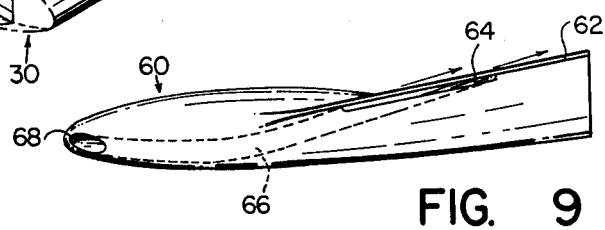
FIG. 9 is an end view of another embodiment of the wing tip similar to that shown in FIG. 6 with a leading edge inlet for discharging fluid at the outboard edge of the wing tip.

FIG. 9 illustrates another negative conical camber wing tip 60 having contoured surface portions which meet at an upswept sharply angled edge 62 along the portion of the tip aft of the chord point of maximum thickness. The wing tip 60 is similar in construction to that shown in FIGS. 6–8 and is provided with an elongated slot 64 in the edge 62 through which fluid is discharged to weaken the tight laminar core of a vortex formed over the tip. The fluid is supplied to the slot through a conduit 66 which has an inlet 68 adjacent the leading edge of the tip 60. The inlet receives ram air that is ducted through the conduit when the wing tip 60 and associated wing is in flight or moving through a medium to produce lift or thrust.

Operationally, the wing tip 60 alleviates vortices by mixing the discharged fluid with the flows over and under the wing and weakening the vortex cores as described in connection with FIG. 8. The discharged fluid directed tangentially outward of the tip also reduces the tendency of the flow under the lower surface of the tip of swirl around the edge 62 and form a vortex at an inboard location. Thus, outboard shedding is promoted and overall wing efficiency is improved.

The advantage of the ram-induced flow over the structure shown in FIGS. 6–8 is that the wing tip 60 is self-energizing, and does not rely upon an external fluid source such as the bleed air from an engine compressor. Accordingly, the tip 60 may be readily adapted to both small and large aircraft without sacrificing primary engine power and without attaching other ram-charged appendages elsewhere on the craft.

Figure 10:
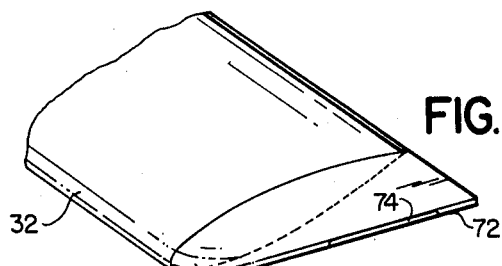
FIG. 10 is a perspective view illustrating still a further embodiment of the wing tip.

FIG. 10 illustrates still a further embodiment of the wing tip in accordance with the present invention without the upswept design of the foregoing embodiments. Instead, the tip extends directly outward of the wing 32 with zero camber. Forward of the chord point of maximum thickness, the surfaces are contoured in a rounded shape to provide a smooth outward termination of the wing 32. Aft of the chord point of maximum thickness, the contoured surfaces meet in a sharply angled outboard edge that extends aft without substantially reducing the spanwise dimension to prevent inboard migration of the vortex origins. Preferably, a slot 74 is provided in the edge 72 so that fluid can be discharged into the merging flows above and below the wing in the same manner as described in connection with FIGS. 8 and 9.

The tip 70 preferably is reduced in thickness as the distance from the connection with the wing 32 increases so that the upper and lower surfaces flatten and become substantially parallel at the tip. With such reduction or flattening, there is also a reduction in the pressure differential of the flows above and below the wing surfaces, and, consequently, a reduced potential forming the vortices on the upper surface of the tip. The flattened, zero camber structure with discharging fluid is, therefore, capable of deterring the development of a strong vortex in the wake of the wing 32.

Figure 11:
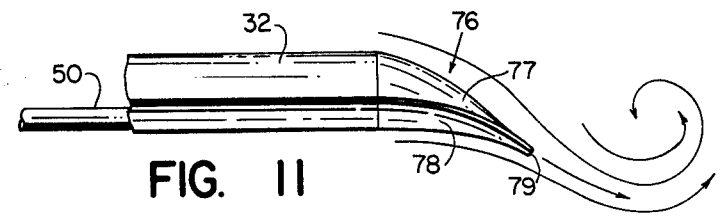
FIG. 11 is an elevation view of a further embodiment of the wing tip similar to that shown in FIG. 8, but with a positive conical camber.

FIG. 11 illustrates a further embodiment of the vortex-alleviating wing tip of the present invention. The wing tip 76 has upper and lower contoured surfaces 77 and 78 respectively which form a tip similar in shape to the tip 30 in FIGS. 6–8, except that the sharply angled outboard edge 79 aft of the chord point of maximum thickness extends outwardly and downwardly to provide positive conical camber rather than negative camber. The upper surface 77 is accordingly convex aft of the chord point of maximum thickness, and the bottom surface 78 is generally concave. The downward curvature of the tip is not sufficient to prevent the flow along the lower surface of the wing from circulating around the edge 79 onto the upper surface for vortex formation. As a consequence, pressurized fluid from a ram-air or other source is delivered through the conduit 50 to a slot in the edge 79 in the same manner as the diffuser 52 and slot 54 in FIG. 6. The fluid is discharged generally tangentially of the surfaces 77 and 78 and merges with the upward flow from the lower surface of the wing so that a mild vortex is shed outboard of the wing. The discharging fluid assures formation of the vortex outboard in a weakened condition as in FIG. 8.

The tip 76 with positive conical camber is especially suited for agricultural aircraft where vortex alleviation and widely distributed downwash in the wake of the aircraft are desirable.

Figure 12:
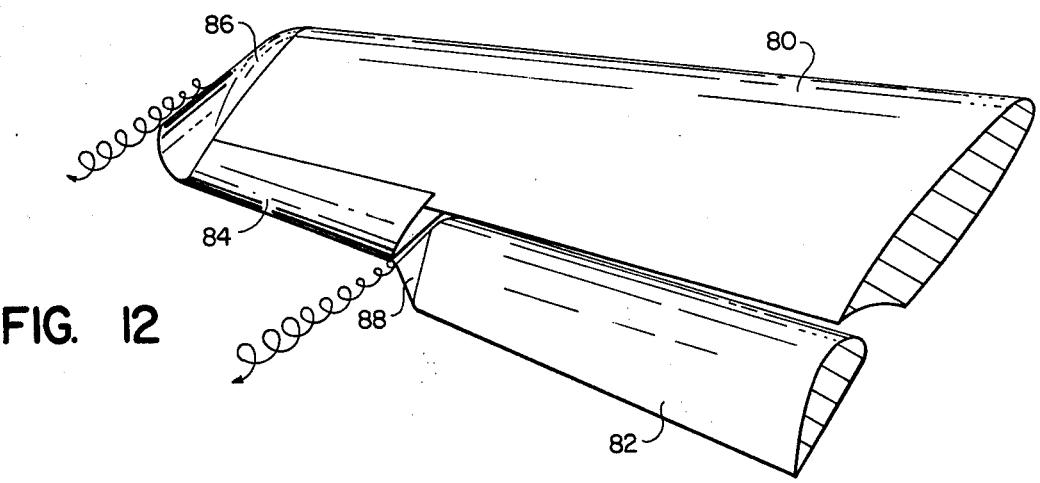
FIG. 12 is a perspective view of a wing utilizing the tip of the present invention at the spanwise termination and having an end plate on the flap at the trailing edge of the wing.
Figure 13:
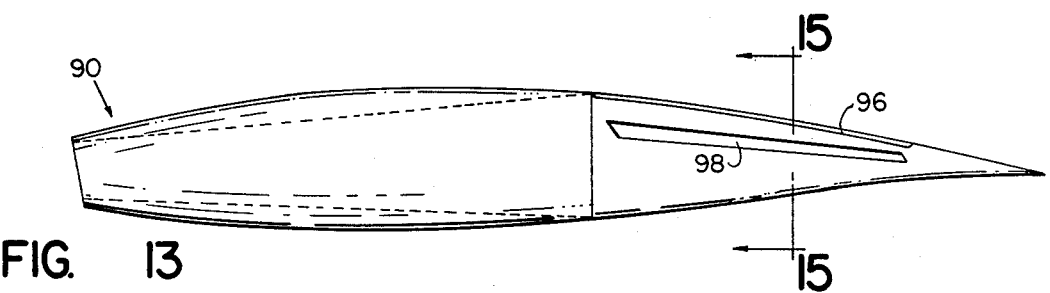
FIG. 13 is an end view of still a further embodiment of the wing tip of the present invention with means for discharging fluids inboard or outboard of the wing to create rolling moments.
Figure 14:
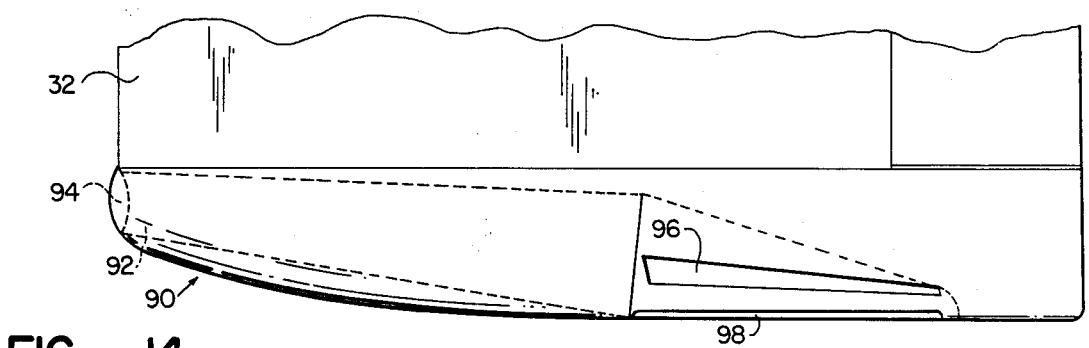
FIG. 14 is a top plan view of the wing tip in FIG. 13.

FIG. 12 is a perspective view of a wing 80 having an airfoil forming an inboard flap 82 at the trailing edge and an aileron 84 along the trailing edge outboard of the flap. A negative conical camber wing tip 86 in accordance with the present invention is connected to the outboard terminus of the wing 80 to alleviate vortex formation and improve wing efficiency as described above. The tip 86 adjacent the trailing edge mates in close fitting relationship with the outboard end of the aileron in its neutral position to form a clean flow of air aft of the wing in this region.

The spanwise ends of the flap 82 are also major sources of vortices when the flaps are lowered in both final approach and departure flight paths. Unfortunately, these critical flight paths are the same localities where high density air traffic occurs. Consequently, vortex alleviation from the edges of flaps is desirable, particularly in view of the high loading of the flap and the vortex flow which such loading yields.

To alleviate the vortex in this situation, an end plate 88 is connected to the outboard end of the flap 82 so as to move with the flap without interference with the adjacent aileron 84. A similar end plate may be added to the inboard end of the flap if the adjacent contour of the craft body does not provide sufficient protection against vortex flow when the flap is in the lowered position.

The end plate 88 does not extend below the lower surface of the flap but projects upwardly above the upper surface and acts as a fence to spanwise flow when the flap is not in its lowered position. In the lowered position of the flap, the end plate prevents circulation from the lower to upper surfaces by closing the gap between the aileron and the flap and stopping vortex formation on the airfoil. This configuration of the flap thus alleviates vortices shed at the outboard edge and reduces drag and loss of lift. Of course, with wings having several segregated flap sections, end plates of this type may be used on each section with cummulative benefits.

Figure 15:
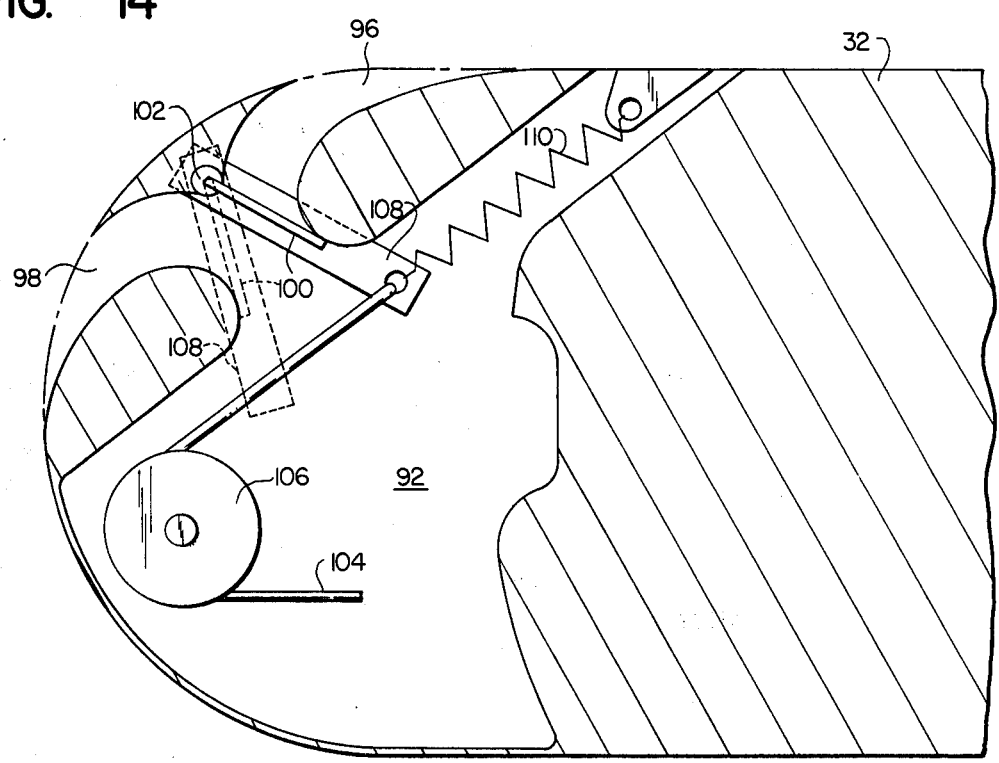
FIG. 15 is a cross section of the wing tip illustrated in FIG. 13 and schematically illustrates the control mechanism for directing fluids either inboard or outboard of the tip.

FIGS. 13-16 illustrate a further embodiment of the present invention in which a wing tip 90 has a substantially rounded configuration as shown in FIG. 15 along the entire outboard edge. The tip 90 has an internal duct 92 leading from a ram inlet 94 at the leading edge to a pair of tangential discharging slots 96 and 98 adjacent the outboard edge in the aft portion of the tip. Within the duct 92 is a flapper valve 100 that is pivotally connected to the tip at a hinge 102 for movement between two positions illustrated in FIG. 15. In one position, the valve closes the passageway leading to the slot 96 at the upper surface of the tip and opens the passageway leading from the duct 92 to the slot 98 at the outboard edge of the tip. In the other position, the valve closes the passageway to the slot 98 and opens the passageway to the slot 96.

It will be observed that when the valve 100 is in the phantom position, the passageway leading from the valve to the slot 96 directs the ram-pressurized fluid within the conduit 92 tangentially inboard over the upper surface of the wing 32 and thereby encourages inward movement of the vortex origin with the corresponding reduction in wing efficiency by loss of lift and increased drag. Also, with the rounded geometric configuration of the tip along the outboard edge, flow of air or other fluid from the lower surface of the wing to the upper surface is facilitated and supports the inward migration of the vortex origin.

Figure 16:
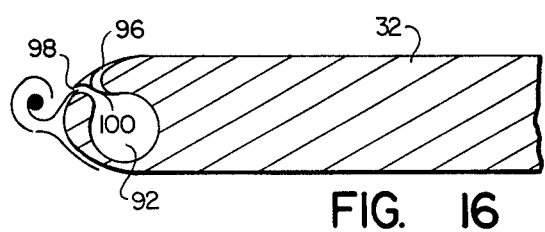
FIG. 16 is a schematic cross section of the wing tip in FIG. 15 and shows the controls in the vortex shedding position.
Figure 17:
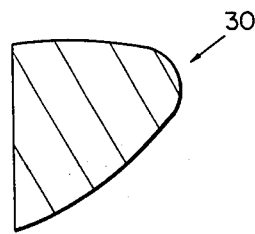
FIGS. 17–21 are cross sectional views of the wing tip at the sections shown in FIG. 6.
Figure 18:
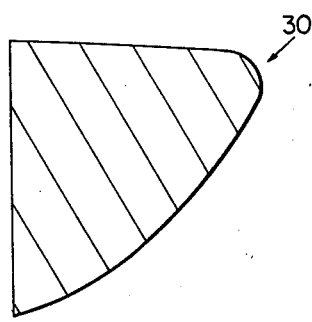
Figure 19:
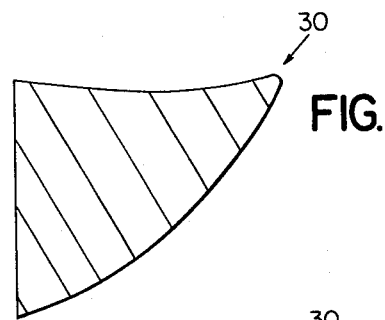

When the flapper valve 100 is in the illustrated solid line position, the passageway to the slot 98 is open and rampressurized fluid is discharged tangentially downwardly over the tip surface in opposition to the relatively high pressure flow of air from the lower surface of the wing to the upper surface. The merging of the downwardly discharged fluid and the high pressure flow from the lower surface results in the functional equivalent of the sharply angled edge shown in the embodiments of FIGS. 4, 5, 6, 10 and 11 which tends to prevent the generation of vortices on the upper surface of the wing. The vortex origin develops outboard of the tip 90 as shown in FIG. 16 when the strength and velocity of the downwardly discharged fluid is sufficient to overcome the pressure differential that produces the opposed flow of fluid toward the upper surface of the wing. Thus, the rounded tip effectively becomes a sharply angled edge when the discharged fluid passes through the slot 98, and is operative as a rounded edge with an attendant promotion of vortex generation when the discharged fluid passes through the slot 96.

The configuration and function of the rounded wing tip 90 is determined by the positioning of the flapper valve 100. One means for controlling the valve is illustrated and includes a control cable 104 leading from an inboard operating mechanism (not shown) around a pulley 106 to an operating lever 108. The lever 108 is biased by a spring 110 to the solid line position of the valve when tension on the cable 104 is relieved, and is moved to the dotted position when the cable is drawn inboard.

With a wing tip 90 at both outboard ends of the wing 32 on an aircraft, the tips are operated to provide vortex alleviation and improved wing efficiency by discharging fluid outboard through the edge slots 98 at both ends of the wing, or alternatively to provide roll moments by discharging fluid through the upper slot 96 in one wing to precipitate separation and vortex genera- tion at an inboard station. The roll moment generated by the inboard discharge results as a consequence of the reduction in wing efficiency and loss of lift at one side of the craft, and may be used for stabilizing or maneuvering the craft. Drag also increases on the wing having reduced efficiency and produces a positive yawing moment that favors or cooperates with the stabilizing or rolling maneuver.

In summary, the present invention concerns a wing tip in several different embodiments, each of which is intended to alleviate the sometimes lethal effects of vortices inherently generated at the free end of an airfoil generating lift or thrust. Additionally, wing efficiency is improved by shedding the vortex adjacent to the outboard edge of the wing so that the effective span is not substantially less than the geometric span. The effective aspect ratio which is proportional to the square of the effective span between wing tip vortices is similarly preserved with a consequential reduction in induced drag, as well as profile drag due to diminution of vortex turbulence.

It will be understood from the foregoing descriptions that the wing tip may take several different configurations with positive, negative and zero camber. In most instances, the addition of discharging means in the sharply angled outboard edge of the wing tip disperses the tight laminar core of the vortex at its origin and more rapidly dissipates the vortex in the wake of the wing. The curvatures illustrated in the contoured surfaces of the wing tips in the drawings are provided as examples and are not limiting in regard to the invention. It is preferable that the sharply angled outboard edge of the wing tip extend forward of the trailing edge along at least one quarter of the outboard edge so that the vortex which has a tendency to originate in that area cannot readily deviate inboard therefrom. Since the vortices tend to form on the aft portion of the wing, the sharply angled edge need not extend forward of the midchord region. Accordingly, the present invention has been described in several preferred embodiments by way of illustration rather than limitation.

I claim:

1. In a wing of finite spanwise extent for producing lift or thrust by virtue of a dynamic flow of fluid over oppositely disposed upper and lower wing surfaces, each of the surfaces extending chordwise from a leading to a trailing edge, an improved tip at the spanwise termination of the wing for bringing about a controlled mergence of the fluid flowing over the upper and lower surfaces at different pressure levels comprising: contoured surface portions joined with the upper and lower wing surfaces and blending smoothly into the upper and lower wing surfaces without abrupt changes in the spanwise direction, the contoured surface portions forward of the chord point of maximum thickness being convexedly rounded without concave portions at any spanwise section in the forward part of the tip and convergent along the outboard edge at large obtuse angles generally at 180 degrees to smoothly interconnect the forward parts of the upper and lower wing surfaces, and aft of the chord point of maximum thickness, the contoured surface portions including a convex lower portion bending gradually upwardly in the spanwise direction with substantially uniform curvature from the junction of the tip and lower wing surface to the outboard edge and joined with a concave upper portion also bending gradually upward in the spanwise direction with substantially uniform curvature from the junction of the tip and upper wing surface to define a gradually tapered, sharp, upwardly swept edge portion and bring about a controlled mergence of the flows above and below the wings, the gradually bending upper and lower portions approaching one another at the outboard edge at acute angles progressively decreasing from the chord point of maximum thickness to the trailing edge, and forming a sharply angled outboard edge without substantial curvature of the surfaces in the chordwise direction to reduce differential pressure and to precipitate vortices generated by the confluence of flows over the upper and lower surfaces with immediate separation at the spanwise termination of the wing.

2. The wing of claim 1 wherein the spanwise dimensions of the wing tip aft of the chord point of maximum thickness are not smaller in planform than the spanwise dimension of the tip at said chord point.

3. The wing of claim 1 wherein the sharply angled edge aft of the chord point of maximum thickness slopes upwardly and outwardly of the wing from said point to maintain an effective aspect ratio of the wing not substantially less than the geometric aspect ratio of the wing.

4. The wing of claim 1 further including means defining a fluid discharge in the gradually tapered, sharply angled, swept edge portion, and fluid supply means connected with the discharge defining means for discharging pressurized fluid into the confluence of the flows at the outboard edge.

5. The wing of claim 4 wherein the means defining a fluid discharge includes means defining a slot in the outboard edge.

6. The wing of claim 4 wherein the fluid supply means comprises ram inlet means defining a fluid inlet adjacent the leading edge of the wing, and a fluid conduit within the wing and connecting the inlet with the discharge at the outboard edge.

7. The wing of claim 1 wherein the aft portion of the sharply angled edge lies in a plane above the upper wing surface.

8. A lift-producing wing of limited span for reducing induced drag and vortex strength comprising:
upper and lower wing surfaces joined forwardly at a leading edge and aft at a trailing edge, the wing surfaces also extending spanwise and having shaped upper and lower terminal portions projecting in a gradually tapered fashion outwardly to a spanwise flattened tip and joined with one another at the tip along a sharply angled outer edge of the wing aft of the chord point of maximum thickness to permit fluid flows above and below the wing surfaces to merge at the angled outer edge, the angled outer edge of the wing extending forward from a point at the trailing edge at least as far outboard on the wing as any other point on the wing, and the terminal portions being shaped with uniform, curvatures in the spanwise direction between the wing and the outer edge, one of the portions having a concave curvature and the other having a convex curvature; and
aperture means located at the angled outer edge of the wing and defining an opening for discharging fluid outwardly and rearwardly in the direction of lift producing fluid flowing from below the wing into merging flows from below and above the wing surfaces as the wing develops lift or thrust to thereby weaken wing tip vortices and shift the vortex origins outboard of the wing.

9. A wing of limited span as defined in claim 8 wherein the aperture means defines a slot in the sharply angled outer edge.

10. A wing of limited span as defined in claim 8 wherein the shaped terminal portion having the concave curvature is an extension of the upper wing surface, and the shaped terminal portion having the convex curvature is an extension of the lower wing surface to define a tip portion of negative conical camber.

11. A wing of limited span as defined in claim 8 wherein the shaped terminal portion having the concave curvature is an extension of the lower wing surface, and the shaped terminal portion having the convex curvature is an extension of the upper wing surface to define a tip portion of positive conical camber.

12. A wing of limited span as defined in claim 8 further including fluid conduit means connected with the aperture means at the sharply angled outer edge for directing the discharged fluid outboard of the edge and generally tangent to the shaped and joined terminal portions at the edge.

13. A wing of limited span as defined in claim 8 wherein the terminal portions of the wing surfaces are also joined with one another along a rounded outer edge; and the rounded edge is located forward of the chord point of maximum thickness.

14. An aircraft comprising a main body and an airfoil having upper and lower surfaces for producing lift when the airfoil is moved through air, the airfoil being connected at one end with the body of the craft and having an opposite, outer end from which fluid dynamic vortices emanate due to the mergence of fluid flows from above and below the foil while the foil is producing lift, the outer end of the foil projecting spanwise and gradually tapering to a sharply angled outer edge aft of the chord point of maximum thickness for vortex precipitation which edge in planform is located effectively no closer to the main body at the trailing edge of the foil than at the midchord region to prevent inward migration of the vortex origins and to reduce the induced drag, the gradual tapering being accompanied by substantially no curvature of the surfaces in the chordwise direction between the chordpoint of maximum thickness and the trailing edge to correspondingly reduce the differential pressure between the upper and lower surfaces and reduce the strength of the vortices produced thereby, and means defining an outwardly and rearwardly directed conduit at the projecting, sharply angled edge for discharging a fluid into the mergence of the fluid flows to dissipate the fluid dynamic vortices which are produced.

15. An aircraft as defined in claim 14 wherein the outer end of the airfoil has a zero camber.

16. An aircraft as defined in claim 14 wherein the outer end of the airfoil is upswept and defines a negative conical camber.

17. An aircraft as defined in claim 14 wherein the outer end of the airfoil is downswept and defines a positive conical camber.

18. An aircraft as defined in claim 14 wherein the airfoil comprises a wing having another airfoil in the form of a flap connected at the trailing edge of the wing and movable between a lowered and raised position; and an end plate is connected to one end of the flap to inhibit the formation of vortices on the flap.

19. An airfoil as defined in claim 18 further including an aileron movable about a neutral position and connected at the trailing edge of the wing adjacent the outboard end of the flap; and the end plate is mounted on the end of the flap adjacent the aileron and is shaped to effectively close the space between the aileron in the neutral position and the flap in a lower position.

20. In a craft having lift generating foils extending from a central body laterally outboard at each side of the craft, improved aerodynamic tips at the outboard ends of the foils comprising:
 a rounded tip at the outboard end of each lift-generating foil;
 means at the outboard end of each lift-generating foil for discharging fluid alternatively outboard tangentially of the foil and over the rounded tip for vortex alleviation, or tangentially inboard over the foil into the region of vortex origins to improve vortex generation;
 fluid supply means connected with the discharging means for providing the fluid to be discharged inboard and outboard; and
 fluid control means connected with the discharging means for controlling the discharging of fluid and directing the fluid alternatively outboard or inboard over the foil.

21. The improved aerodynamic tips of claim 20 wherein the discharging means comprises a first tangential discharge passageway for directing fluid outboard of the foil and the craft, a second tangential discharge passageway for directing fluid inboard over the foil, and valve means for selectively directing fluid out of the first and second passageways, the fluid control means being connected with the valve means.

22. The improved aerodynamic tips of claim 21 wherein the fluid supply means comprises a fluid duct within the lift-generating foil and having an inlet receiving ram-pressurized fluid from outside the craft.

23. In a wing of finite spanwise extent, an improved tip at the spanwise termination as defined in claim 1 wherein the gradually bending upper and lower tip portions meet at the outboard edge aft of the chord point of maximum thickness in acute angles not greater than 10 degrees.

24. An aircraft comprising a main body and an airfoil having upper and lower surfaces for producing lift when the airfoil is moved through air, the airfoil being connected at one end with the body of the craft and having an opposite, outer end from which fluid dynamic vortices emanate due to the mergence of fluid flows from above and below the foil while the foil is producing lift, the outer end of the foil projecting spanwise and having upper and lower surfaces meeting substantially at 180 degrees without concave portions at any spanwise section in the part of the tip forward of the chord point of maximum thickness, and aft of the chord point of maximum thickness gradually tapering to a sharply angled edge for vortex precipitation which edge in planform is located effectively no closer to the main body at the trailing edge of the foil than at the midchord region to prevent inward migration of the vortex origins and to reduce the induced drag, the gradual tapering providing substantially no curvature of the surfaces in the chordwise direction aft of the chordpoint of maximum thickness to correspondingly reduce the differential pressure between the upper and lower surfaces and reduce the strength of the vortices produced thereby.

* * * * *